(12) United States Patent
Chapman

(10) Patent No.: US 11,028,337 B1
(45) Date of Patent: Jun. 8, 2021

(54) STRUCTURE INCLUDING RICE HULL ASH AND REINFORCING BINDER FOR ADSORBING CONTAMINANTS FROM COOKING OIL

(71) Applicant: FreshFry LLC, Louisville, KY (US)

(72) Inventor: Jeremiah Chapman, Louisville, KY (US)

(73) Assignee: FreshFry LLC, Louisville, KY (US)

( * ) Notice: Subject to any disclaimer, the term of this patent is extended or adjusted under 35 U.S.C. 154(b) by 120 days.

(21) Appl. No.: 16/401,295

(22) Filed: May 2, 2019

Related U.S. Application Data

(63) Continuation-in-part of application No. 15/383,791, filed on Dec. 19, 2016, now abandoned, which is a
(Continued)

(51) Int. Cl.
    *C11B 3/10*      (2006.01)
    *B01D 15/00*      (2006.01)
    (Continued)

(52) U.S. Cl.
    CPC ............... *C11B 3/10* (2013.01); *B01J 20/103* (2013.01); *B01J 20/2803* (2013.01); *B01J 20/28004* (2013.01); *B01J 20/2805* (2013.01); *B01J 20/3042* (2013.01); *B01J 20/3078* (2013.01); *B01J 20/3092* (2013.01);
    (Continued)

(58) Field of Classification Search
None
See application file for complete search history.

(56) References Cited

U.S. PATENT DOCUMENTS

| | | | | |
|---|---|---|---|---|
| 1,701,092 A | * | 2/1929 | Zoul | ........................ C11B 3/16 554/189 |
| 4,645,605 A | * | 2/1987 | Durham | ................. B01D 46/00 210/679 |

(Continued)

FOREIGN PATENT DOCUMENTS

| | | | |
|---|---|---|---|
| CN | 103785675 A | * | 5/2014 |
| JP | 01151937 A | * | 6/1989 |

OTHER PUBLICATIONS

Proctor et al, Adsorption of Soy Oil Free Fatty Acids by Rich Hull Ash, Jan. 1990, JAOCS, vol. 1, No. 1, pp. 15-17. (Year: 1990).*
(Continued)

*Primary Examiner* — Matthew O Savage
(74) *Attorney, Agent, or Firm* — Stites & Harbison, PLLC; David W. Nagle, Jr.

(57) ABSTRACT

A structure for adsorbing contaminants from cooking oil comprises: an outer shell comprised of a filter material; and an adsorbing mixture comprising rice hull ash blended with a reinforcing binder, wherein the adsorbing mixture is in the form of particles having a particle size from about 0.30 millimeters (300 microns) to about 1.40 millimeters (1400 microns), with an average particle size of about 0.60 millimeters (600 microns) to about 0.70 millimeters (700 microns). The adsorbing mixture is enclosed by the outer shell, such that, in use, cooking oil with the contaminants passes through the outer shell, contacts the adsorbing mixture within the outer shell, and then again passes through the outer shell with substantially fewer contaminants.

16 Claims, 8 Drawing Sheets

Related U.S. Application Data continuation of application No. 14/277,871, filed on May 15, 2014, now abandoned.

(51) Int. Cl.
*B01J 20/10* (2006.01)
*C10G 25/00* (2006.01)
*B01J 20/30* (2006.01)
*B01J 20/28* (2006.01)

(52) U.S. Cl.
CPC ............ *C10G 25/003* (2013.01); *B01D 15/00* (2013.01); *B01D 2215/00* (2013.01); *C10G 2300/202* (2013.01)

(56) References Cited

U.S. PATENT DOCUMENTS

| | | | | |
|---|---|---|---|---|
| 4,676,907 A * | 6/1987 | Harrison | ............... | C02F 1/283 210/617 |
| 4,765,545 A * | 8/1988 | Van Kruining | ......... | B01J 20/00 110/346 |
| 4,831,010 A * | 5/1989 | Herringer | ......... | B01J 20/28033 502/400 |
| 4,880,652 A * | 11/1989 | Regutti | ............... | A47J 37/1223 426/417 |
| 5,488,021 A * | 1/1996 | DeLiso | ................... | B01J 20/20 502/413 |
| 6,712,974 B1 * | 3/2004 | Palm | ...................... | B01D 39/06 210/348 |
| 6,797,172 B2 * | 9/2004 | Koseoglu | ................. | A23J 7/00 210/651 |
| 7,279,147 B2 * | 10/2007 | Turkay | .................... | B01J 20/10 106/600 |
| 7,374,684 B2 * | 5/2008 | Gibson | ................... | B01J 20/14 210/638 |
| 7,452,702 B2 * | 11/2008 | Lee | .......................... | C11C 3/10 435/134 |
| 7,514,010 B2 * | 4/2009 | Salmon | ............... | B01D 61/025 210/777 |
| 7,850,012 B2 * | 12/2010 | Gibson | .................... | B01J 20/14 210/502.1 |
| 7,867,538 B2 * | 1/2011 | Binder | .................... | A23D 9/06 426/423 |
| 7,947,167 B2 * | 5/2011 | Osaheni | ................. | C10G 25/06 208/251 R |
| 7,989,010 B2 * | 8/2011 | Brothers, Jr. | .......... | B01J 20/103 426/271 |
| 8,263,153 B2 * | 9/2012 | Forchhammer | ...... | C12H 1/0408 426/422 |
| 8,492,444 B2 * | 7/2013 | Hammond | .............. | A23L 33/16 514/783 |
| 8,685,680 B2 * | 4/2014 | Binder | ..................... | C11B 3/10 435/134 |
| 2008/0160156 A1 * | 7/2008 | Withiam | ................... | C11B 3/10 426/601 |
| 2009/0065435 A1 * | 3/2009 | Li | ......................... | B01D 39/06 210/669 |
| 2009/0084732 A1 * | 4/2009 | Masters | ............... | B01J 20/2805 210/689 |
| 2011/0189361 A1 * | 8/2011 | Rao | .......................... | C11B 3/10 426/417 |
| 2011/0195166 A1 * | 8/2011 | Li | .......................... | B01D 15/00 426/417 |
| 2014/0050829 A1 * | 2/2014 | Yamashita | ............. | B01D 15/00 426/271 |
| 2019/0270067 A1 * | 9/2019 | Wang | ...................... | B01J 20/10 |

OTHER PUBLICATIONS

Manique et al, Rice Hull Ash as an Adsorbent for Purifying Biodiesel from Waste Frying Oil, Jul. 2011, Fuel, vol. 92, pp. 56-61. (Year: 2011).*

United States Department of Agriculture Grant for the Use of Rice Hull Ash Oil Processing Silica Gel Production, and Basic Adsorption Studies, Dec. 1993. (Year: 1993).*

Yucel et al, Purification of FAME by Rice Hull Ash Adsorption, Apr. 2003, AOCS, vol. 80, No. 4, pp. 373-376 (Year: 2003).*

* cited by examiner

STRUCTURE INCLUDING RICE HULL ASH AND REINFORCING BINDER FOR ADSORBING CONTAMINANTS FROM COOKING OIL

CROSS-REFERENCE TO RELATED APPLICATIONS

The present application is a continuation-in-part of U.S. patent application Ser. No. 15/383,791 filed on Dec. 19, 2016, which is a continuation of U.S. patent application Ser. No. 14/277,871 filed on May 15, 2014, the entire disclosures of which are incorporated herein by reference.

BACKGROUND OF THE INVENTION

The present invention relates to the adsorption of contaminants from a liquid, and, more particularly, the adsorption of free fatty acids, oxidized fatty acids, polymers, and other contaminants from cooking oil.

Cooking oil is used in many applications related to food preparation, including the frying of foods, often in a deep fryer. Types of cooking oil include, for example, olive oil, palm oil, soybean oil, canola oil, pumpkin seed oil, safflower oil, peanut oil, grape seed oil, sesame oil, argan oil, rice bran oil, and other vegetable oils, as well as animal-based oils, such as butter, tallow, and lard. The cooking oil provides a desirable taste, color, and crispness when frying foods at a temperature around 300° F. to 350° F. Due to this high operating temperature, however, rapid degradation of the cooking oil occurs at both the oil-air interface and within the oil phase, thus resulting in by-products that can inhibit the attainment of the desired characteristics of food cooked in the cooking oil. Often, the remedy for this degradation is the disposal and replacement of the cooking oil.

For instance, at the oil-air interface, there is a constant introduction of hydrogen, oxygen, and free radicals in the hydrocarbon chains of the cooking oil. As the temperature of the cooking oil increases, the rate of oxidation of the cooking oil also increases, thus creating oxidized fatty acids. The increase of oxidized fatty acids in the cooking oil sometimes leads to the cooking oil having undesirable smells and flavor. Therefore, the increase in oxidized fatty acids necessitates the disposal and replacement of the cooking oil.

Similarly, the process of hydrolysis occurs within cooking oil as food is fried. The cooking oil permeates the surface of the food being fried and displaces water into the surrounding oil phase. Hydrolysis occurs in the cooking oil if the displaced water is not vaporized or removed from the cooking oil. The displaced water and available oxygen react with the hydrocarbon chains comprising the cooking oil to form free fatty acids. The free fatty acids and displaced water result in the cooking oil having a lower smoke point and the formation of foam-like, soapy films on the cooking oil. This film acts as a surfactant on the surface of the food placed in the cooking oil, such that more cooking oil is absorbed into the food, often resulting in greasy, soft food that is undesirable.

In short, various contaminants are produced as the cooking oil is heated and used in preparing food, including, but not limited to, oxidized fatty acids, free fatty acids, polymers, polar molecules, color bodies, glycerin, and combinations thereof.

Aside from disposal and replacement, another option exists to prolong the operational life of cooking oil, which is the remediation of the cooking oil by removing those contaminants present in the cooking oil. Current methods for removing contaminants from cooking oil include, for example, the use of magnesium silicate powder. The process of removing contaminants with magnesium silicate powder requires the cooking oil to be first removed from the vessel used for cooking, often a deep fryer. The cooking oil is then placed into a secondary vessel designed specifically for the use of filtering the cooking oil. Specifically, a filter is placed in the secondary vessel prior to introducing the cooking oil into the secondary vessel, and the magnesium silicate powder is placed on top of the filter. The cooking oil is then poured though the filter and the magnesium silicate powder into the secondary vessel. The secondary vessel may also be fitted with a recirculating pump, which recirculates the cooking oil through the filter multiple times to filter out the contaminants. Upon completion of the filtering, the recirculating pump is used to move the cooking oil back to the vessel used for cooking. The magnesium silicate powder is then removed from the secondary vessel and discarded, and the secondary vessel is then cleaned of remaining sediment and contaminants.

However, the current methods of remediating cooking oil, such as that described above, are expensive and potentially dangerous to the user, with hot cooking oil being transferred between vessels. Furthermore, the current methods not only are time-consuming and laborious, but also consume significant materials.

Consequently, food service businesses are in need of a more efficient process for remediating cooking oil. Moreover, food service businesses are in need of a self-contained filtering process that does not require the transfer or movement of the cooking oil from vessel-to-vessel. Further still, food service businesses are in need of a remediation method that provides improved safety and energy efficiency.

SUMMARY OF THE INVENTION

The present invention is a structure and method for adsorbing contaminants from cooking oil or a similar liquid.

An exemplary structure for adsorbing contaminants from cooking oil or a similar liquid made includes an outer shell comprised of filter material, which defines an interior cavity for holding an adsorbing mixture. The outer shell must allow the cooking oil or similar liquid to pass into and out of the interior cavity defined by the outer shell, but not allow the adsorbing mixture and adsorbed contaminants to exit the interior cavity defined by the outer shell. Thus, the outer shell includes integral pores (or openings) which allow the cooking oil or similar liquid to pass into and out of the interior cavity, but such pores (or openings) are smaller than the smallest particles of the adsorbing mixture.

In some embodiments, the filter material is a nonwoven fiber. In this regard, the filter material must be sufficiently heavy and strong enough to not only hold the adsorbing mixture, but also to do so without tearing, degrading, swelling, or otherwise failing when placed into hot cooking oil for a time period.

The adsorbing mixture is comprised of rice hull ash blended with a reinforcing binder. In some embodiments, the adsorbing mixture is in the form of particles having a particle size from about 0.30 millimeters (300 microns) to about 1.40 millimeters (1400 microns), with an average particle size of about 0.60 millimeters (600 microns) to about 0.70 millimeters (700 microns). In an exemplary method for blending and processing the rice hull ash to form an adsorbing mixture with a desired particle size, a predetermined amount of rice hull ash is combined with a predetermined amount of a reinforcing binder, such as a granular clay, to create a mixture. A predetermined volume of water is added to the mixture of rice hull ash and the reinforcing binder. The mixture is then blended for a predetermined time period, and then dried. After blending and drying, the mixture is then classified to remove particles that are less than about 0.30 millimeters (300 microns) or more than about 1.40 millimeters (1400 microns). After blending and classification, the resultant adsorbing mixture is ready to be enclosed in the outer shell, thus resulting in the structure for adsorbing contaminants from cooking oil or a similar liquid.

In use, the adsorbing mixture is introduced into a volume of cooking oil or a similar liquid retained in a vessel. Specifically, the structure, with the adsorbing mixture enclosed in the outer shell, is placed in a basket that is commonly used with a deep fryer. The basket is lowered into the cooking oil of the deep fryer with the structure in the basket. The cooking oil flows through the outer shell of the structure and interacts with the adsorbing mixture. As the cooking oil interacts with the adsorbing mixture, contaminants are drawn from the cooking oil and adsorbed by the adsorbing mixture. After the structure has remained in the cooking oil for a period of time, it is removed from the cooking oil, and the remaining cooking oil flows out of the structure through the outer shell during such removal. At the same time, however, contaminants remain within the interior cavity defined by the outer shell with the adsorbing mixture.

DETAILED DESCRIPTION OF THE INVENTION

The present invention is a structure and method for adsorbing contaminants from cooking oil or a similar liquid.

Figure 1:
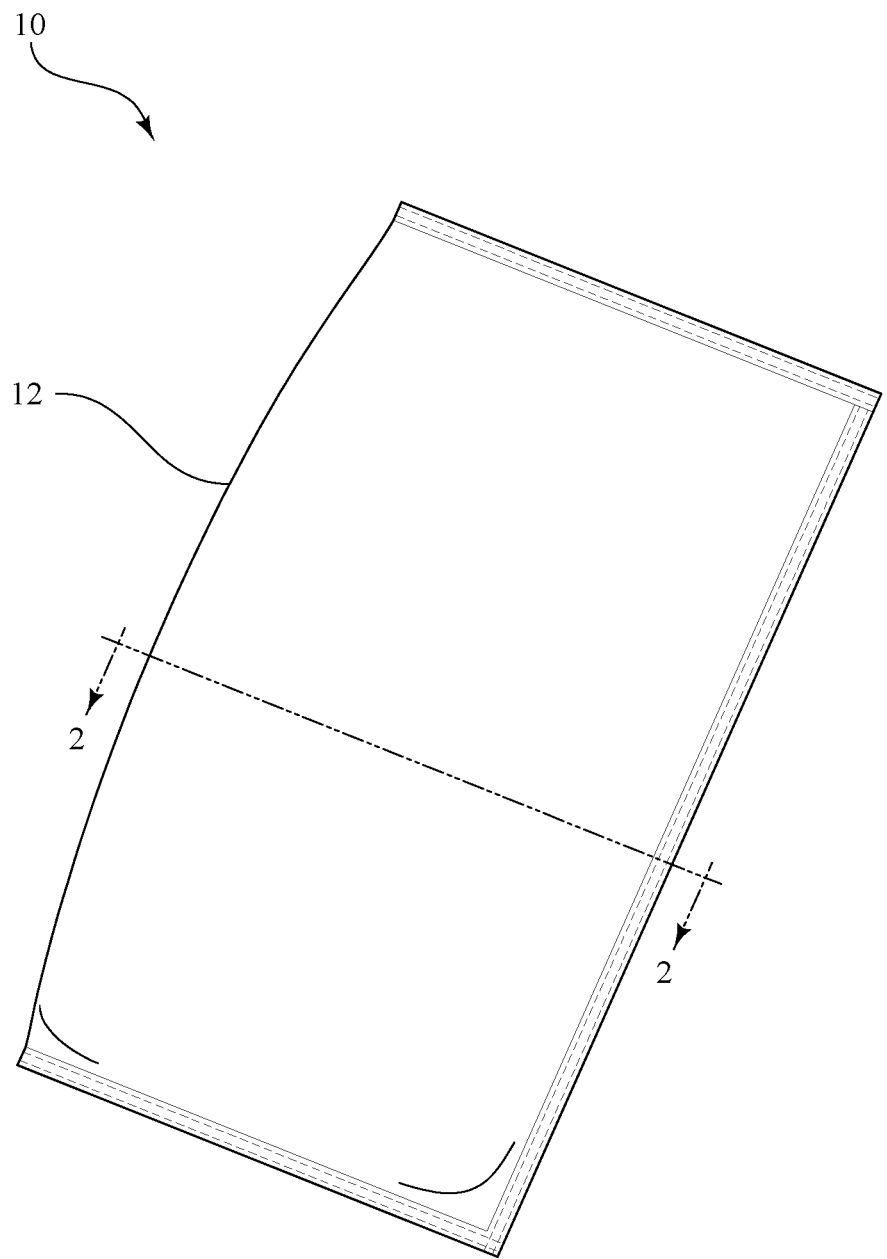
FIG. 1 is a perspective view of an exemplary structure for adsorbing contaminants from cooking oil or a similar liquid made in accordance with the present invention.

FIG. 1 is a perspective view of an exemplary structure 10 for adsorbing contaminants from cooking oil or a similar liquid made in accordance with the present invention.

Figure 2:
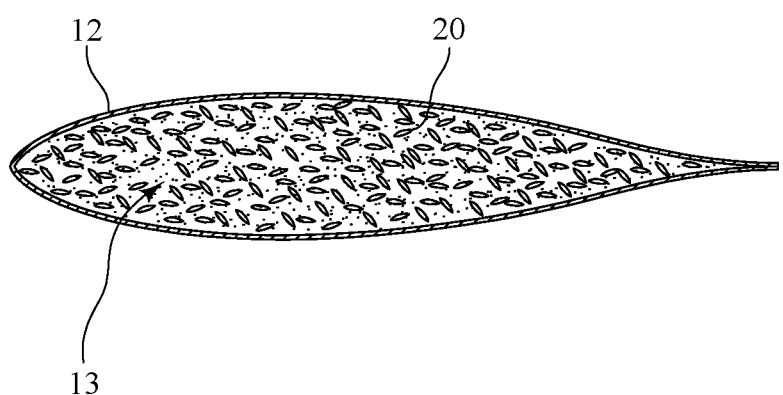
FIG. 2 is a cross-sectional view of the exemplary structure of FIG. 1, taken along line 2-2 of FIG. 1.

FIG. 2 is a cross-sectional view of the exemplary structure of FIG. 1, taken along line 2-2 of FIG. 1.

As shown in FIGS. 1 and 2, the structure 10 includes an outer shell 12 comprised of a filter material, which defines an interior cavity 13 for holding an adsorbing mixture 20 (as further described below). The outer shell 12 must allow the cooking oil or similar liquid to pass into and out of the interior cavity 13 defined by the outer shell 12, but not allow the adsorbing mixture 20 and adsorbed contaminants to exit the interior cavity 13 defined by the outer shell 12. Thus, the outer shell 12 includes integral pores (or openings) which allow the cooking oil or similar liquid to pass into and out of the interior cavity 13, but such pores (or openings) are smaller than the smallest particles of the adsorbing mixture 20, as further described below.

In some embodiments, the filter material is a nonwoven fiber. In some embodiments, a suitable nonwoven fiber has an approximate weight of about 100 g/m$^2$ to about 150 g/m$^2$. In this regard, the filter material must be sufficiently heavy and strong enough to not only hold the adsorbing mixture 20, but also to do so without tearing, degrading, swelling, or otherwise failing when placed into hot cooking oil for a time period. One commercially available filter material suitable for use as the outer shell 12 is a hybrid fabric composed of a polyester (PET) and polyamide (PA), which is marketed and distributed under the trade name Madaline (or Madaline Trendsetter) by Mogul Tekstil Sanayi Ve Ticaret Anonim Sirketi of Gaziantep, Turkey. This filter material is a non-woven fiber of 70% polyester (PET) and 30% polyamide (PA). In one preferred formulation, it has an approximate weight of about 100 g/m$^2$ and a nominal thickness of 0.31 mm. In another preferred formulation, it has an approximate weight of about 150 g/m$^2$ and a nominal thickness of 0.42 mm Referring still to FIGS. 1 and 2, as mentioned above, the outer shell 12 of the structure 10 defines the interior cavity 13 for holding the adsorbing mixture 20. The adsorbing mixture is comprised of rice hull ash blended with a reinforcing binder. In some embodiments, the adsorbing mixture is in the form of particles having a particle size from about 0.30 millimeters (300 microns) to about 1.40 millimeters (1400 microns), with an average particle size of about 0.60 millimeters (600 microns) to about 0.70 millimeters (700 microns).

The rice hull ash is derived from rice hulls (or rice husks), which are the hard protective coverings of rice grains. Combustion of rice hulls results in rice hull ash (also referred to as "RHA"), which can be effective used as a silica-based adsorbent material. One commercially available rice hull ash suitable for use in the adsorbing mixture 20 is marketed and distributed under the registered trademark MAXFLO® by Agrilectric Research Company, LLC of Baton Rouge, La. However, in order to function properly and efficiently as a means by which to adsorb contaminants from cooking oil or a similar liquid, in accordance with the teachings of the present invention, the rice hull ash is blended with a reinforcing binder and processed to form an adsorbing mixture 20 with the desired particle size.

Figure 3:
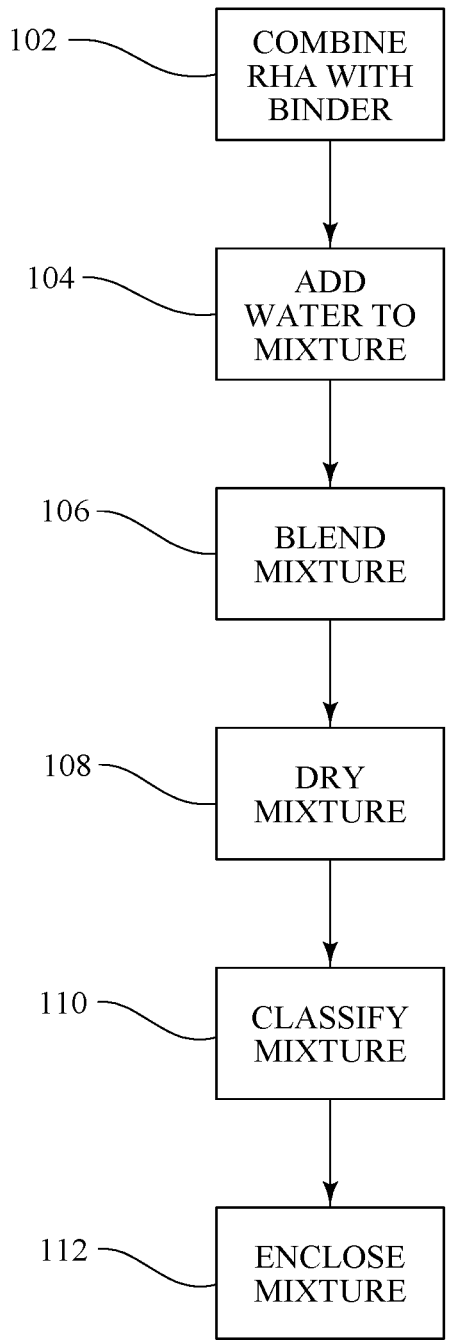
FIG. 3 is a flow chart that illustrates an exemplary method for blending and processing rice hull ash to form an adsorbing mixture with a desired particle size in accordance with the present invention.

FIG. 3 is a flow chart that illustrates an exemplary method for blending and processing the rice hull ash to form an adsorbing mixture 20 with a desired particle size in accordance with the present invention.

First, a predetermined amount of rice hull ash is combined with a predetermined amount of a reinforcing binder to create a mixture, as indicated by block 102 in FIG. 3. In some embodiments, the reinforcing binder is a granular clay, wherein the granular clay is in the range of 10-50% of the mixture by weight. In some embodiments, the reinforcing binder is a granular clay, wherein the granular clay is in the range of 12-35% of the mixture by weight. One commercially available granular clay suitable for use in the adsorbing mixture 20 is attapulgite (a/k/a magnesium aluminum phyllosilicate), which is commercially available from Oil-Dri Corporation of America of Chicago, Ill. In one exemplary implementation, approximately 80 grams of rice hull ash is combined with approximately 20 grams of granular clay.

A predetermined volume of water is added to the mixture of rice hull ash and the reinforcing binder, as indicated by block 104 in FIG. 3. In the above-described exemplary implementation, in which the mixture includes approximately 80 grams of rice hull ash and approximately 20 grams of the reinforcing binder in the form of a granular clay, the predetermined volume of water is approximately 1.5 ounces by weight.

The mixture is then blended for a predetermined time period, as indicated by block 106 in FIG. 3. In the above-described exemplary implementation in which the mixture includes approximately 80 grams of rice hull ash and approximately 20 grams of granular clay, along with 1.5 ounces of water, the predetermined time period is approximately 0.50 to 2.0 minutes.

With respect to such blending, it is intended that granulation produce an adsorbing mixture 20 that is between 300 g/l and 600 g/l in density, granulating with a shear force, not a compaction force. Compaction breaks the rice hull ash pores, but shearing does not. An adsorbing mixture 20 with a density less than 300 g/L requires too much space in the deep fryer during use (as further described below), while an adsorbing mixture 20 with a density greater than 600 g/L may cause internal resistance for adsorption.

Furthermore, it is important to note that the rice hull ash alone would not work because it is too friable, and thus could not effectively function as an adsorbent in a deep fryer, as further described below. The reinforcing binder effectively strengthens the rice hull ash particles, so that the resulting adsorbing mixture 20 can be used in a deep fryer.

Referring still to FIG. 3, the mixture is then dried, as indicated by block 108 in FIG. 3, preferably to reduce moisture content down to 3-7%. Drying can be achieved via various known means, but static drying is preferred. Furthermore, the mixture temperature should not exceed 170° during drying.

After blending, the mixture is then classified to remove particles that are less than about 0.30 millimeters (300 microns) or more than about 1.40 millimeters (1400 microns), as indicated by block 110 in FIG. 3. Such classification can be achieved using a series of classifiers or screens.

Finally, after blending and classification, the resultant adsorbing mixture 20 is ready to be enclosed in the outer shell 12, as indicated by block 112 in FIG. 3, thus resulting in the structure 10 for adsorbing contaminants from cooking oil or a similar liquid.

Figure 4:
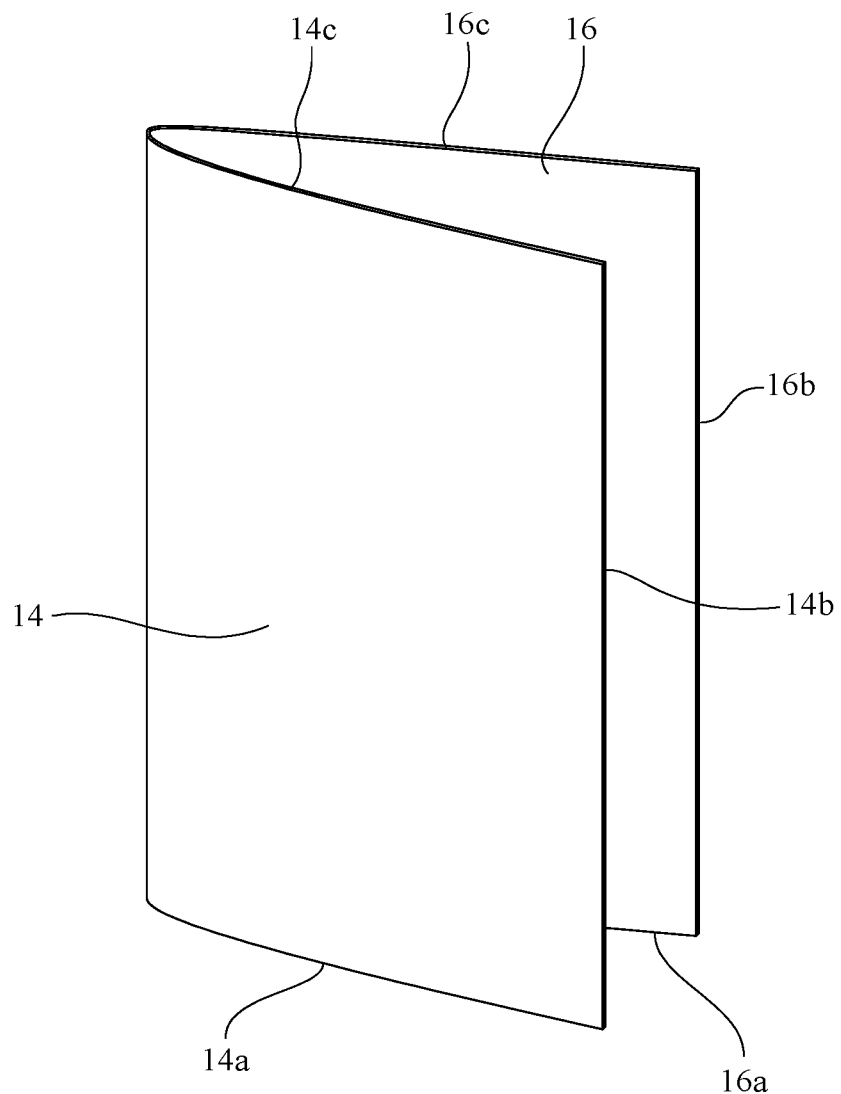
FIG. 4 is a perspective view of a single piece of filter material as used to create the outer shell of the exemplary structure of FIG. 1.
Figure 5:
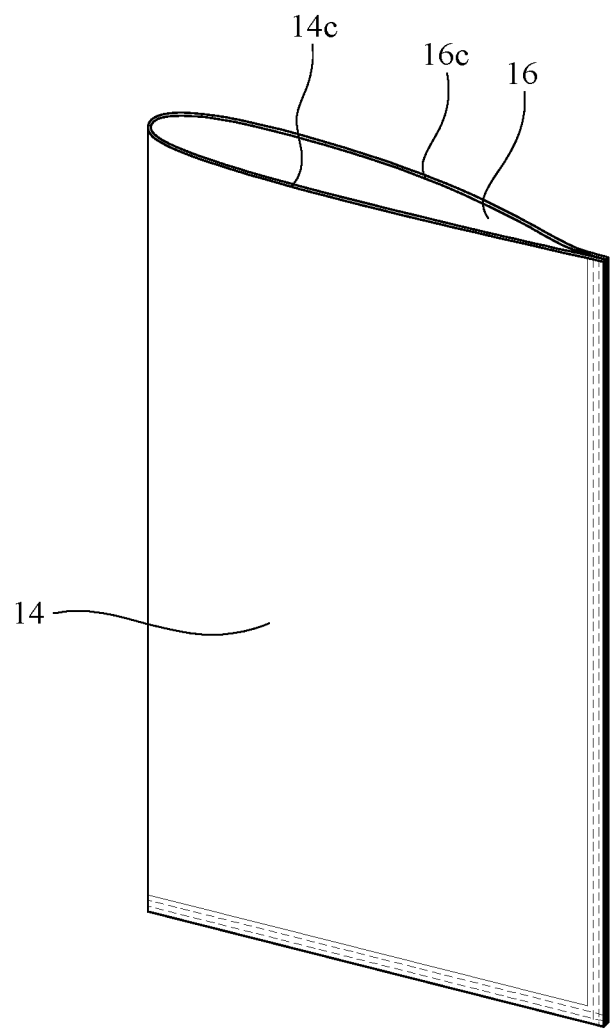
FIG. 5 is a perspective view similar to that of FIG. 4, but wherein certain edges have been joined together.

With respect to the enclosure of the adsorbing mixture 20 into the outer shell 12 to form the structure 10, in one exemplary implementation, a single piece of filter material is used to form the structure 10. Specifically, as shown in FIG. 4, the single piece of filter material is folded in half, such that it can be characterized as having a front panel 14 and rear panel 16, with the interior cavity 13 defined between the front panel 14 and the rear panel 16. The respective lower edges 14a, 16a of the front and rear panels 14, 16 are joined, for example, via ultrasonic welding, as shown in FIG. 5. Similarly, the side edges 14b, 16b of the front and rear panels 14, 16 are joined, for example, via ultrasonic welding, as also shown in FIG. 5. The adsorbing mixture 20 can then be poured into the interior cavity 13 between the front and rear panels 14, 16. Finally, the respective upper edges 14c, 16c of the front and rear panels 14, 16 are joined, for example, via ultrasonic welding, resulting in the structure 10 shown in FIG. 1.

Referring again to FIG. 1, since the structure 10 is often used in commercial deep fryers, through experimentation, it has been determined than an optimal size for the outer shell of the structure 10 is 5.25 inches by 9.0 inches. Furthermore, through experimentation, it has been determined that approximately 6.0 ounces of the adsorbing mixture 20 should be included in an outer shell 12 of this size.

Figure 6:
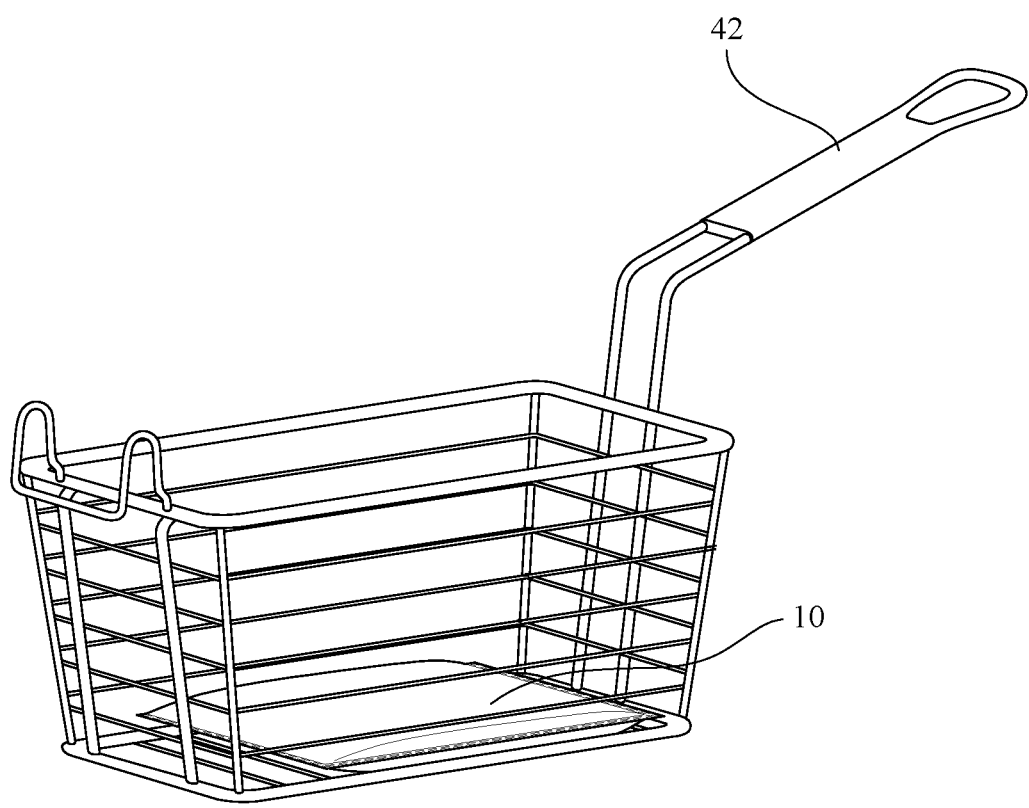
FIG. 6 illustrates the placement of the exemplary structure of FIG. 1 in a basket of a deep fryer.
Figure 7:
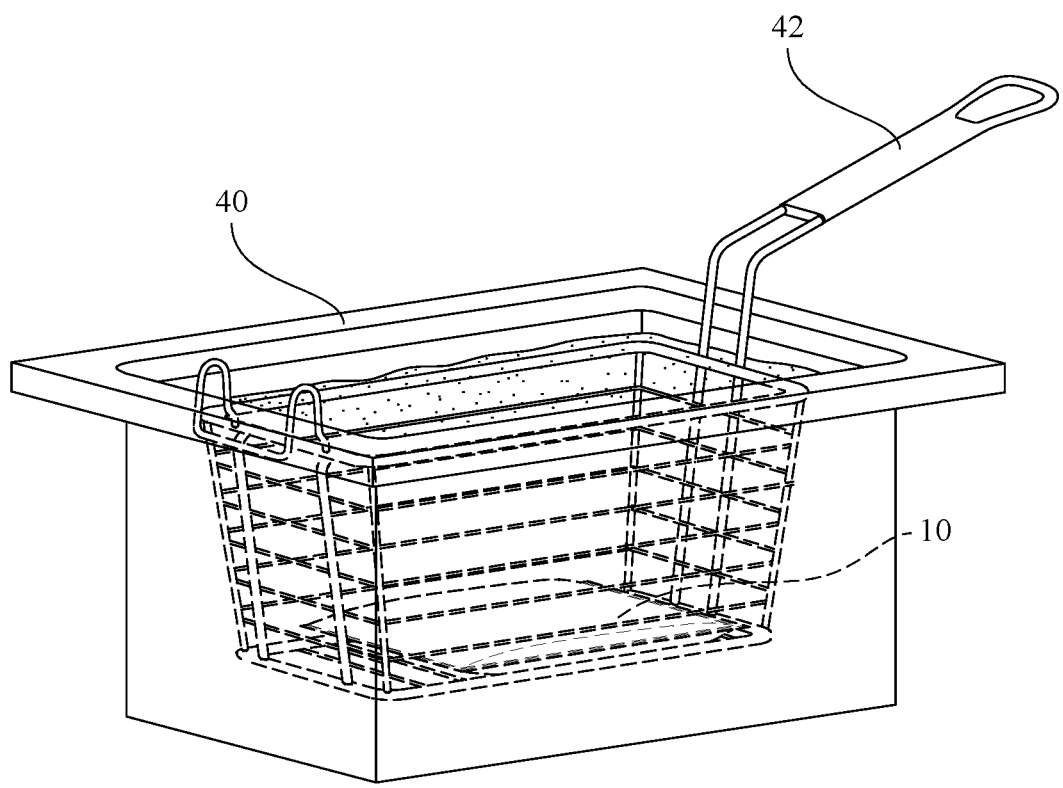
FIG. 7 illustrates the lowering of the basket of FIG. 6 into the deep fryer.
Figure 8:
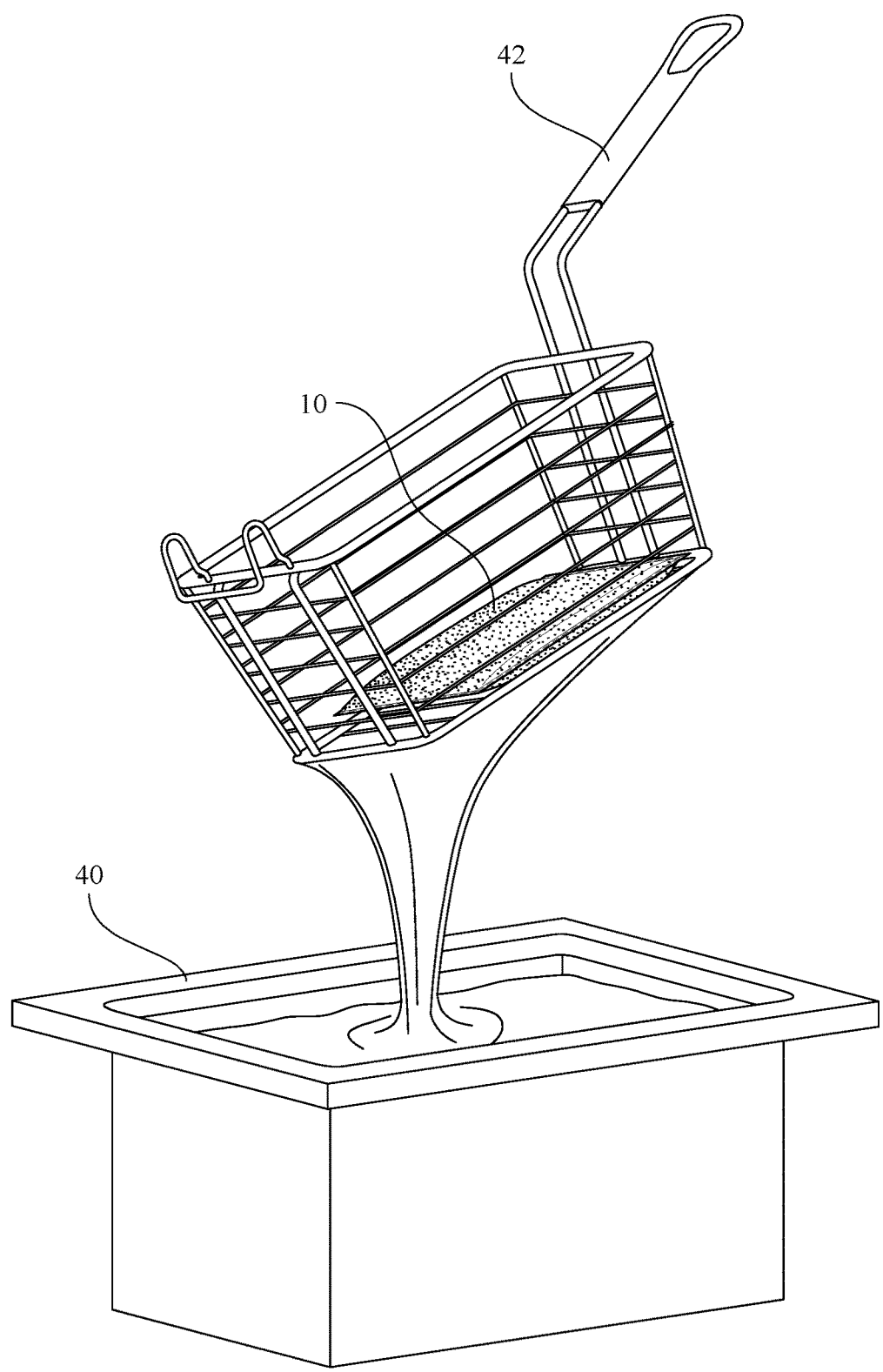
FIG. 8 illustrates the removal of the basket of FIG. 6 from the deep fryer.

Furthermore, with respect to the adsorbing mixture 20, it is preferred that the average pore size of each of the rice hull ash and the reinforcing binder (e.g., granular clay) is in the range of 30-90 Å. It is preferred that surface area measurement of the rice hull ash, as determined by the Brunauer-Emmett-Teller (BET) method, is between 50-600 m$^2$/g, while the preferred surface area of the granular clay is between 100-200 m$^2$/g. An increase in the surface area could increase efficacy, but should not drop the average pore size below 30 Å for the rice hull ash or the reinforcing binder. Preferred cumulative volumes are between 0.074-0.44 cm$^3$/g. Isotherms for the adsorbing mixture 20 should follow a hysteresis of an H3 model (or H4 model) at low-pressure testing, which indicates that a majority of the pores are slit-like pores. The above-described physical properties are important for non-pressure and non-vacuum filtration (such as the intended placement and use in a deep fryer) where external mechanical forces are not available to aid in accessing the internal pore network within the adsorbing mixture 20. Referring now to FIGS. 6-8, in use, the adsorbing mixture 20 is introduced into a volume of cooking oil or a similar liquid retained in a vessel. Specifically, in FIGS. 6-8, the adsorbing mixture 20 is enclosed in the outer shell 12 in the manner described above with reference to FIGS. 1-5, and the entire structure 10 is placed in a basket 42 that is commonly used with a deep fryer 40. Such a basket 42 is used for holding food and lowering it into the cooking oil, and then raising the food out of the cooking oil when it is finished cooking. As shown in FIG. 7, the basket 42 is lowered into the cooking oil of the deep fryer 40 in the same way that it would be for cooking food, but this time, with the structure 10 in the basket 42. The cooking oil flows through the outer shell 12 of the structure 10 and interacts with the adsorbing mixture 20. As the cooking oil interacts with the adsorbing mixture 20, contaminants are drawn from the cooking oil and adsorbed by the adsorbing mixture 20. In this regard, hot cooking oil naturally moves and circulates within the deep fryer 40.

Referring still to FIG. 7, the structure 10 remains in the cooking oil for a period of time to allow for sufficient interaction with the cooking oil. For example, in some cases, the structure 10 may be placed in the cooking oil at the end of a day, while the cooking oil is still hot, but remain in the cooking oil overnight. If left in the deep fryer 40 overnight, the deep fryer 40 can be turned back on and the cooking oil returned to operating temperature before removal of the structure 10, thinning the cooking oil and making it easier for the cooking oil to drain from the structure 10.

Referring now to FIG. 8, the structure 10 is removed from the cooking oil, and the remaining cooking oil flows out of the structure 10 through the outer shell 12 during such removal. Furthermore, by applying pressure to the structure 10, any remaining cooking oil can be squeezed out through the outer shell 12. At the same time, however, contaminants remain within the interior cavity 13 defined by the outer shell 12 with the adsorbing mixture 20.

As mentioned above, in at least some embodiments, the adsorbing mixture is in the form of particles having a particle size from about 0.30 millimeters (300 microns) to about 1.40 millimeters (1400 microns). Such upper and lower limits for the particle sizes are not arbitrary, but rather have been identified though experimentation. Specifically, particle sizes of less than 300 microns could potentially increase adsorption, but cause cooking oil to be retained within the interior cavity 13 defined by the outer shell 12 with the adsorbing mixture 20. In other words, too much cooking oil is retained by the structure 10. If the particles are larger than 1400 microns, there is significantly more internal adsorption resistance, and performance is negatively impacted.

In some embodiments of the present invention, the adsorbing mixture 20 may also include a secondary binder, which is preferably water-soluble and binds to the rice hull ash, thus aiding in forming an adsorbing mixture 20 with the desired particle size. For example, one secondary binder that has been identified for use in forming an adsorbing mixture 20 with the desired particle size is sodium carboxymethyl cellulose, which is used to create a more uniform, dispersed, and stable mixture. Furthermore, the addition of this secondary binder creates a low-dust, low-attrition particle, which binds at low temperatures and gives strength to the particle before complete drying.

In some embodiments of the present invention, the adsorbing mixture 20 may also include one or more silicates, which are intended to increase the ability of the adsorbing mixture 20 to adsorb contaminants. Such silicates may include, for example, aluminum calcium silicate, calcium silicate, diatomaceous earth, magnesium silicate, silica aerogel, silicon dioxides, sodium silicate, talc, tricalcium silicate, and combinations thereof. Further, in some embodiments, aluminosilicates may be added to the adsorbing mixture 20, including, for example, sodium aluminosilicate, sodium calcium aluminosilicate, and combinations thereof. Further still, in some embodiments, chlorides, such as calcium chloride, may be added to the adsorbing mixture 20 to aid in neutralizing the acidity of the cooking oil in a cost-efficient manner.

Finally, although the above description focuses on the removal of contaminants in cooking oil, the structure and method of the present invention can be used for cleaning other liquids, including, for example biodiesel products, without departing from the spirit and scope of the present invention.

One of ordinary skill in the art will recognize that additional embodiments are also possible without departing from the teachings of the present invention. This detailed description, and particularly the specific details of the exemplary embodiments disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A structure for adsorbing contaminants from cooking oil, comprising:
    an outer shell comprised of a filter material; and
    an adsorbing mixture comprising rice hull ash blended with a reinforcing binder, wherein the adsorbing mixture is in the form of particles having a particle size from about 0.30 millimeters (300 microns) to about 1.40 millimeters (1400 microns), with an average particle size of about 0.60 millimeters (600 microns) to about 0.70 millimeters (700 microns); and
    wherein the adsorbing mixture is arranged to be enclosed by the outer shell, such that, in use, cooking oil with the contaminants passes through the outer shell, contacts the adsorbing mixture within the outer shell, and then again passes through the outer shell with substantially fewer contaminants.

2. The structure as recited in claim 1, wherein the filter material is nonwoven with an approximate weight of about 100 g/m$^2$ to about 150 g/m$^2$.

3. The structure as recited in claim 1, wherein the adsorbing mixture has a density of between approximately 300 g/l and 600 g/l.

4. The structure as recited in claim 1, wherein the outer shell encloses approximately 6 ounces of the adsorbing mixture.

5. The structure as recited in claim 1, wherein the outer shell has dimensions of approximately 5.25 inches by 9.0 inches.

6. The structure as recited in claim 1, wherein the reinforcing binder is a granular clay.

7. The structure as recited in claim 6, wherein the granular clay is in a range of 10-50% of the adsorbing mixture by weight.

8. The structure as recited in claim 6, wherein the granular clay is in a range of 12-35% of the adsorbing mixture by weight.

9. The structure as recited in claim 1, wherein the adsorbing mixture further comprises a secondary binder.

10. The structure as recited in claim 9, wherein the secondary binder is sodium carboxymethyl cellulose polymer.

11. A structure for adsorbing contaminants from cooking oil, comprising:
    an outer shell comprised of a filter material; and
    an adsorbing mixture comprising rice hull ash blended with a reinforcing binder, wherein the adsorbing mixture is in the form of particles having a particle size from about 0.30 millimeters (300 microns) to about 1.40 millimeters (1400 microns), with an average particle size of about 0.60 millimeters (600 microns) to about 0.70 millimeters (700 microns);
    wherein the adsorbing mixture is arranged to be enclosed by the outer shell, such that, in use, cooking oil with the contaminants passes through the outer shell, contacts the adsorbing mixture within the outer shell, and then again passes through the outer shell with substantially fewer contaminants;
    wherein the adsorbing mixture has a density of between approximately 300 g/l and 600 g/l; and
    wherein the outer shell encloses approximately 6 ounces of the adsorbing mixture.

12. The structure as recited in claim 11, wherein the outer shell has dimensions of approximately 5.25 inches by 9.0 inches.

13. A structure for adsorbing contaminants from cooking oil, comprising:
    an outer shell comprised of a filter material; and
    an adsorbing mixture comprising rice hull ash blended with a reinforcing binder, wherein the adsorbing mixture is in the form of particles having a particle size from about 0.30 millimeters (300 microns) to about 1.40 millimeters (1400 microns), with an average particle size of about 0.60 millimeters (600 microns) to about 0.70 millimeters (700 microns);
    wherein the reinforcing binder is a granular clay that is in a range of 10-50% of the adsorbing mixture by weight; and wherein the adsorbing mixture is arranged to be enclosed by the outer shell, such that, in use, cooking oil with the contaminants passes through the outer shell, contacts the adsorbing mixture within the outer shell, and then again passes through the outer shell with substantially fewer contaminants.

14. The structure as recited in claim 13, wherein the granular clay is in a range of 12-35% of the adsorbing mixture by weight.

15. The structure as recited in claim 13, wherein the adsorbing mixture further comprises a secondary binder.

16. The structure as recited in claim 14, wherein the secondary binder is sodium carboxymethyl cellulose polymer.

* * * * *